United States Patent [19]

Insinger, III et al.

[11] Patent Number: 4,500,295
[45] Date of Patent: Feb. 19, 1985

[54] PERSONAL ALPHA CONTAMINATION SIMULATOR AND DETECTOR

[75] Inventors: Richard H. Insinger, III, Tangerine; Alfred H. Rodemann, Maitland, both of Fla.

[73] Assignee: The United States of America as represented by the Secretary of the Navy, Washington, D.C.

[21] Appl. No.: 498,337

[22] Filed: May 26, 1983

[51] Int. Cl.³ .............................................. G09B 9/00
[52] U.S. Cl. .................................... 434/218; 324/202; 324/207; 73/432 SD
[58] Field of Search ................ 434/218; 324/202, 207; 73/432 SD

[56] References Cited

U.S. PATENT DOCUMENTS 3,035,772  5/1962  Hough et al. ...................... 434/218
4,321,535  3/1982  Allen .................................. 324/209

FOREIGN PATENT DOCUMENTS 836553  6/1960  United Kingdom ............... 434/218.

Primary Examiner—Paul E. Shapiro
Assistant Examiner—Leo P. Picard
Attorney, Agent, or Firm—Robert F. Beers; Robert W. Adams

[57] ABSTRACT

A simulated radiation source and a compatible detector system are disclosed. The combination is useful in training for detecting alpha radiation contamination. A flexible, soft iron plate or first permanent magnet in the detector system responds to a second magnet that is employed to represent an alpha radiation source. Where the first permanent magnet is used, an iron member may be adopted in lieu of the second magnet. The simulated source is affixed to the subject's clothing or body. When the detector system is brought into proximity with the simulated radiation source, the soft plate or first magnet responds and affects a strain gage which in turn provides an electronic indication.

7 Claims, 1 Drawing Figure

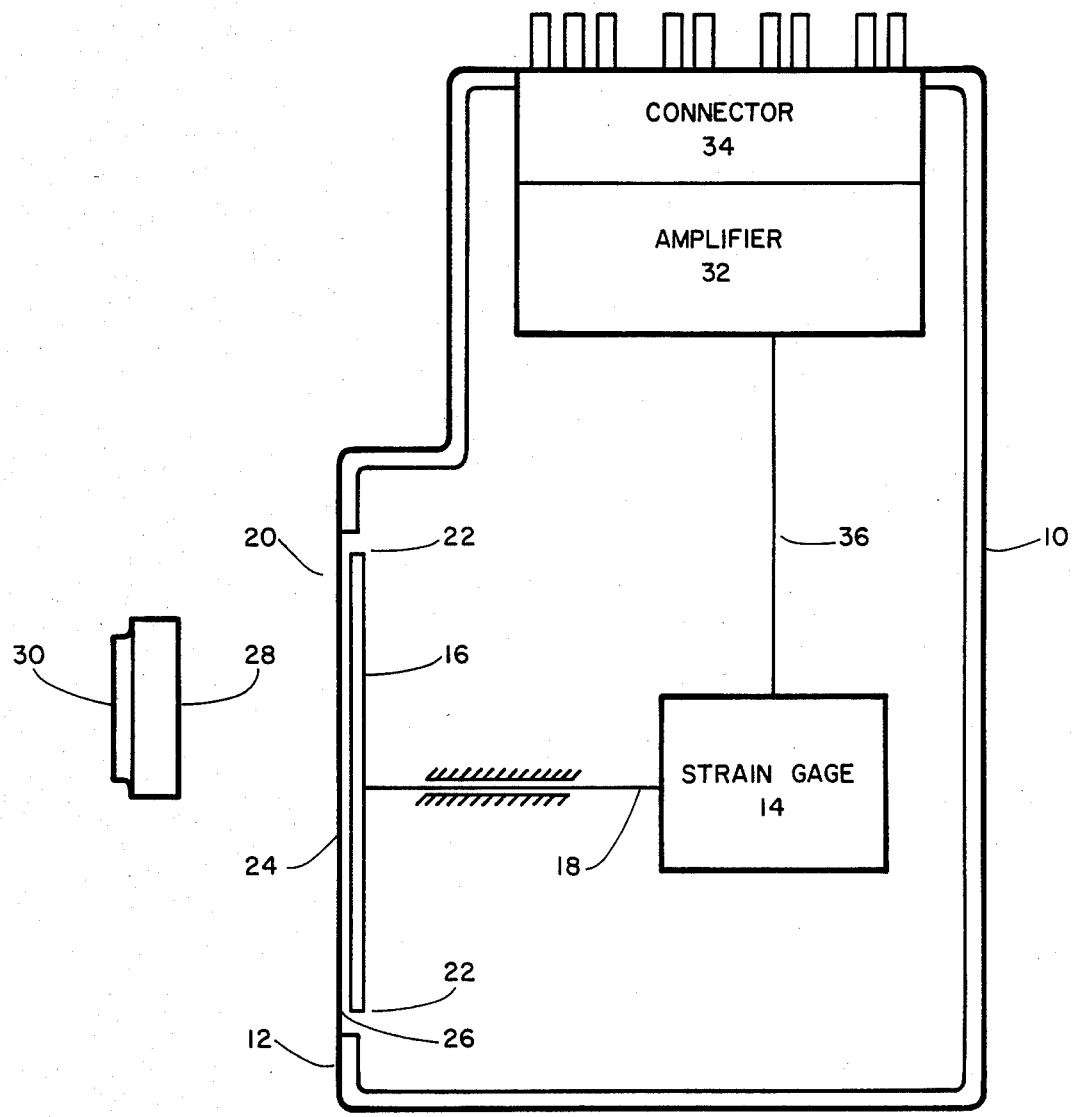

PERSONAL ALPHA CONTAMINATION SIMULATOR AND DETECTOR

BACKGROUND OF THE INVENTION

The present invention relates to training devices, and more specifically to simulators of radiation detectors. The invention provides a means by which operators, or operators-in-training, of Radiac equipment or like radiation detectors, may polish or acquire their skills.

The Services and other professional fields require performance by personnel from time to time in or near radiation-hazardous environments. Radiac equipment provides an operational means for detecting radiation contamination on such personnel and their clothing. But, for such equipment to provide a positive detection, the personnel or his/her clothing must be contaminated.

Training in the operational environment is therefore inappropriate. It is far better to simulate the hazard than to unnecessarily expose trainee and subject personnel to contamination. The environment remains safe to personnel if simulation is employed; and, if the simulation is realistic, the training will not suffer.

The most significant previous device for training in a non-hazardous environment uses a low-power radio transmitter. The transmitter is the alpha radiation contamination, and the receiver is the detector. By carefully choosing the transmitter's emission and the receiver's sensitivity, the simulated detector can be made to respond in a fashion similar to operational equipment, for the singular point on the subjects clothing in which the transmitter is hidden. Costs are usually considered excessive to duplicate the transmitter at a variety of points on the subject's clothing and, as a result, realism suffers. In addition, such transmitters are electronic equipment, which makes them subject to power failure and rough handling, in addition to a finite life.

The present invention overcomes the disadvantages of previous devices by using magnets in a manner that will be hereinafter disclosed. Magnets have been used before to produce electrical signals, as represented by U.S. Pat. No. 3,934,160 to Von Borcke, wherein magnetic field dependent semiconductors are arranged adjacent to each other on one pole of a magnet. As an iron member is drawn from covering relationship of one semiconductor to covering relationship of the other, the magnetic field changes and the semiconductors respond by generating electrical signals if connected in an electrical circuit. Non-contact sensing is represented by U.S. Pat. No. 4,160,204 to Holmgren et al, wherein the distance between an electromagnetic sensitive, inductive transducer and an object is sensed by a signal phase network formed with the transducer and a bridge circuit comparator coupled to the network and a reference signal. And, indicating devices that are responsive to a changing magnetic field are represented by U.S. Pat. No. 2,876,415 to R. C. Hoff, wherein increases in the permeance of the circuit across the gap between poles of a horseshoe magnet cause a decrease in the maxwells in the flux field. Such a decrease in flux permits a mechanical arrangement of spring and lever to close a switch to a lamp.

Accordingly, it is an object of the present invention to provide an improved training device for detecting simulated alpha radiation contamination, and to do so by adopting and using one or more magnets in a new and novel manner and arrangement for simulation.

SUMMARY OF THE INVENTION

The present invention simulates the response of a probe of a Radiac device. The Radiac is operationally used to detect contamination of alpha radiation on clothing and personnel. By simulation, the present invention permits training devoid of the dangers associated with radiation contamination. The present invention is also simpler and much less costly than previous attempts at simulation. Excellent reliability is inherent in the present invention.

Employed are magnets and the associated magnetic field to simulate the radiation and/or detection means. The natural attraction/repulsion between magnets and ferrous metals provides the force that is sensed by a strain gage which alters in response thereto the electrical output it provides. The output is coupled to the operational Radiac, or like, equipment, which sensibly responds to the alteration in a manner like the operational detection of alpha radiation.

BRIEF DESCRIPTION OF THE DRAWING

The FIGURE is a graphical depiction of a preferred embodiment of the present invention, arranged most conveniently to show an intended application of the apparatus. Block diagram form has been adopted where appropriate, for simplicity.

DESCRIPTION OF A PREFERRED EMBODIMENT

The FIGURE shows a representative arrangement of a preferred embodiment of the present invention. Shown is Radiac auxiliary probe housing or simulated probe housing 10. Housing 10 simulates for a trainee the physical appearance and handling of an operational alpha radiation detection probe. Housing 10 includes portion 12 designed to face a subject being tested for simulated alpha radiation contamination. Such subject may be a personnel member wearing clothing that has been modified in accordance with this invention for training purposes, as will be hereinafter described.

Within housing 10 is the electromechanical assembly that simulates the detection response of an operational alpha radiation detection probe. The assembly comprises strain gage 14 that is responsive to deflection in plate 16 by means of coupling 18. Strain gage 14 may be of conventional design, selected for compatible response to the expected extent of movement in coupling 18. Plate 16 is mounted for freedom of movement in alignment with aperture 20 in portion 12, and is chosen to be magnetically responsive. Such plate may be, for example, a magnet, or of a ferrous material. In addition, if its ends or perimeter 22 are fixedly mounted, plate 16 should be chosen deformable to permit deflection that will be transmitted by coupling 18 for detection by strain gage 14. Aperture 20 may be occupied by flexible panel 24 as a covering to enclose housing 10. As such, it may be made of plastic film. In addition, a design alternative permits plate 16 to be attached to surface 26 of panel 24. If used separate from plate 16, however, panel 24 should not be of a magnetically responsive material, inasmuch as if it were, it would shield plate 16 from the simulated alpha radiation that will now be discussed.

Magnet 28 simulates a point source of alpha radiation contamination. Magnet 28 provides magnetic flux which magnetically attracts plate 16 when plate 16 is brought into proximity with magnet 28. If plate 16 is a magnet, care should be taken in orienting magnet 28 to insure polar attraction with plate 16. Magnet 28 may be surfaced with attachment means 30 for easy attachment to clothing. Attachment means 30 may be an adhesive, for example, or VELCRO, and may be used on any convenient surfaces(s) of magnet 28. Preferably, magnet 28 is of a size that is easily concealed in a subject's clothing.

The remainder of the embodiment shown in the FIGURE consists of amplifier 32 and electrical connector 34. Amplifier 32 is coupled of line(s) 36 to the electrical signal output provided by strain gage 14, and is included to prepare the electrical signal output for connection to the operational Radiac equipment mainframe, or other such alpha radiation detection mainframe. Amplifier 32 may be an operational amplifier of conventional design, selected for its characteristics to compatibly interface strain gage 14 to the operational mainframe. The output of amplifier 32 is provided at connector 34. Connector 34 may be an electronic plug or jack (not shown), as required, for simulation of the operational probe and compatibility with the operational alpha radiation detection mainframe.

The embodiment of the present invention shown in the FIGURE operates as follows: Magnet 28 is concealed within the clothing of a test subject and fixed thereto by optional attachment means 30. A person in training as operator of an alpha radiation detection instrument, takes up housing 10 as he/she would take up the auxiliary probe of a Radiac device or other alpha radiation detection instrument. When housing 10 enters the proximity of magnet 28, magnetically responsive plate 16 is attracted to magnet 28, thereby causing a force that is transmitted by coupling 18 to strain gage 14. Strain gage 14 converts the force into an electrical signal that is adapted and coupled by amplifier 32 through connector 34 to the operational alpha radiation detector mainframe. In the alternative, the output of amplifier 32 may be coupled to a simulated alpha radiation detector mainframe, if available. Thereby, trainee is given an opportunity to develop valuable skills in operating the detector and detecting point sources of alpha radiation contamination on personnel and equipment.

Exemplary of the Radiac set to which operation may be simulated is the AN/PDR-56 (F) Alpha Radiac Set, with Alpha Radiacmeter IM-160F/PR-56 and auxiliary probe DT-228A/PDR-56. Meter reading using simulated auxiliary probe for an AN/PDR-56(F) should be 600 CPM±20% when probe is within one (1) inch of the simulated point source of alpha contamination, and the meter reading should then decay linearly to zero (0) when the probe is removed 1.5"±0.1" from the simulated point source of alpha contamination.

Obviously many modifications and variations of the present invention are possible in light of the above teachings. It is, therefore, to be understood that within the scope of the appended claims the invention may be practiced otherwise than as specifically described.

What is claimed is:

1. Apparatus useful as a portable radiation comtamination training device that simulates detection of alpha radiation on personnel and clothing by reacting to a magnet that has been purposefully placed on a personnel subject, comprising:
    a housing simulating in appearance the probe of an operational alpha radiation detection device, having a portion designed to face said subject during said training;
    a deformable, magnetically responsive material mounted within said housing adjacent said portion;
    gage means fixedly coupled to said material for providing an electrical signal indicative of deformation in said material;
    electronic means coupled to said signal for preparing said signal to be coupled to said operational alpha radiation detection device.

2. The apparatus of claim 1 wherein said magnetically responsive material is a deformable iron plate.

3. The apparatus of claim 1 wherein said deformable, magnetically responsive material is a magnet.

4. The apparatus of claim 1 wherein said portion is a flat, solid surface; and said apparatus further comprises a flexible panel mounted within said housing adjacent said portion of said housing designed to face said subject, and on which said deformable, magnetically responsive material is mounted.

5. The apparatus of claim 4 wherein said flexible panel is a plastic film.

6. The apparatus of claim 1 wherein said portion includes at least one aperture, and said magnetically responsive material is mounted in covering relationship to said aperture.

7. A simulated Radiac probe, comprising:
    a Radiac probe housing, having a face;
    a ferrous plate within said housing having its major surface parallel to said face;
    a strain gage attached to said plate that is sensitive to deflections in said plate, having an electrical output to provide a signal proportional to said deflections;
    amplification means coupled to said electrical output for adapting said signal for coupling to an operational Radiac probe fitting;
    whereby a magnetic field may be used to simulate alpha radiation in training for detection of radiation contaminated clothing and personnel; said signal is indicative of said field; and, said operational Radiac is thereby simulated for training.

* * * * *